(12) United States Patent
Foss et al.

(10) Patent No.: US 7,921,733 B2
(45) Date of Patent: Apr. 12, 2011

(54) MAGNETIC FLOWMETER WITH COIL GROUND PATH DETECTION

(75) Inventors: Scot R. Foss, Eden Prairie, MN (US); Robert K. Schulz, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 126 days.

(21) Appl. No.: 12/398,302

(22) Filed: Mar. 5, 2009

(65) Prior Publication Data
US 2010/0224008 A1 Sep. 9, 2010

(51) Int. Cl.
*G01F 1/58* (2006.01)
(52) U.S. Cl. ........................................ 73/861.12
(58) Field of Classification Search .................. None
See application file for complete search history.

(56) References Cited

U.S. PATENT DOCUMENTS

| | | | |
|---|---|---|---|
| 4,563,904 A | 1/1986 | Geisler et al. | 73/861.12 |
| 4,916,381 A * | 4/1990 | Gelecinskyj et al. | 323/285 |
| 5,325,728 A * | 7/1994 | Zimmerman et al. | 73/861.12 |
| 5,351,554 A * | 10/1994 | Budmiger | 73/861.17 |
| 5,372,045 A * | 12/1994 | Schulz et al. | 73/861.12 |
| 5,530,639 A * | 6/1996 | Schulz et al. | 363/17 |
| 5,639,970 A | 6/1997 | Schulz | 73/861.12 |
| 6,453,754 B1 * | 9/2002 | Florin | 73/861.11 |
| 6,644,127 B1 * | 11/2003 | Matzen | 73/861.12 |
| 6,920,799 B1 * | 7/2005 | Schulz | 73/861.52 |
| 7,619,418 B2 * | 11/2009 | Schulz et al. | 324/520 |
| 2006/0095217 A1 | 5/2006 | Coursolle et al. | 702/49 |

FOREIGN PATENT DOCUMENTS

| | | |
|---|---|---|
| GB | 2081449 | 2/1982 |
| WO | WO 01/90704 | 11/2001 |
| WO | WO 2008/042290 | 4/2008 |

OTHER PUBLICATIONS

Notification of Transmittal of the International Search Report and the Written Opinion of the International Searching Authority, or the Declaration for related application PCT/US2010/025728 filed Mar. 1, 2010; 11 pages.

* cited by examiner

*Primary Examiner* — Harshad Patel
(74) *Attorney, Agent, or Firm* — Westman, Champlin & Kelly, P.A.

(57) ABSTRACT

A magnetic flow meter includes a flowtube arranged to receive a flow of process fluid and a coil proximate the flowtube arranged to apply a magnetic field to the process fluid. A sense electrode is arranged to sense a voltage potential in the flowtube in response to the applied magnetic field. The sensed voltage is indicative of flow rate of process fluid through the flowtube. Diagnostic circuitry provides an output related to an electrical path between the coil and electrical ground.

22 Claims, 4 Drawing Sheets

MAGNETIC FLOWMETER WITH COIL GROUND PATH DETECTION

BACKGROUND OF THE INVENTION

The present invention relates to magnetic flowmeters. More specifically, the present invention relates to magnetic flow meters with coil ground path detection.

A magnetic flowmeter measures the volumetric flow rate of a conductive fluid by detecting the velocity of the fluid passing through a magnetic field. Magnetic flowmeter systems typically include a flowtube assembly and a transmitter assembly. The flowtube assembly is installed in a process piping line, either vertically or horizontally, and includes a pipe section, a coil section and electrodes. The coils are located on opposite sides of a cross section of the pipe. The coils, energized by a coil drive current from the transmitter, develop a magnetic field along the cross section of the pipe. Two electrodes are located across the pipe from each other along a line which is perpendicular to the magnetic field. Fluid passing through the pipe is electrically conductive. As a result of the conductor movement through the magnetic field, an electric potential or electromotive force (EMF) is induced in the fluid which can be detected across the electrodes. Operation is thus based on Faraday's law of electromagnetic induction.

The coils in the magnetic flowmeter flowtube may be compromised by process fluid leaking into the coil compartment. This can cause an electrical path between the coil and electrical ground. Electrical paths between the coil and electrical ground can also arise from other sources including age or components fatigue. The electrical ground path causes the drive signal applied to the coil to be reduced because a portion of the coil drive signal flows to electrical ground. This leads to a reduction in the applied EMF and a corresponding reduction in the output from the sense electrodes. This will lead to inaccurate flow measurements.

The loss of the coil drive signal typically cannot be detected by simply measuring the coil drive current. This is because output of the coil drive control circuitry is fixed at a set current level, regardless of any current leakage to ground.

SUMMARY

A magnetic flow meter includes a flowtube arranged to receive a flow of process fluid and a coil proximate the flowtube arranged to apply a magnetic field to the process fluid. A sense electrode is arranged to sense a voltage potential in the flowtube in response to the applied magnetic field. The sensed voltage is indicative of flow rate of process fluid through the flowtube. Diagnostic circuitry provides an output related to an electrical path between the coil and electrical ground.

DETAILED DESCRIPTION

Figure 1:
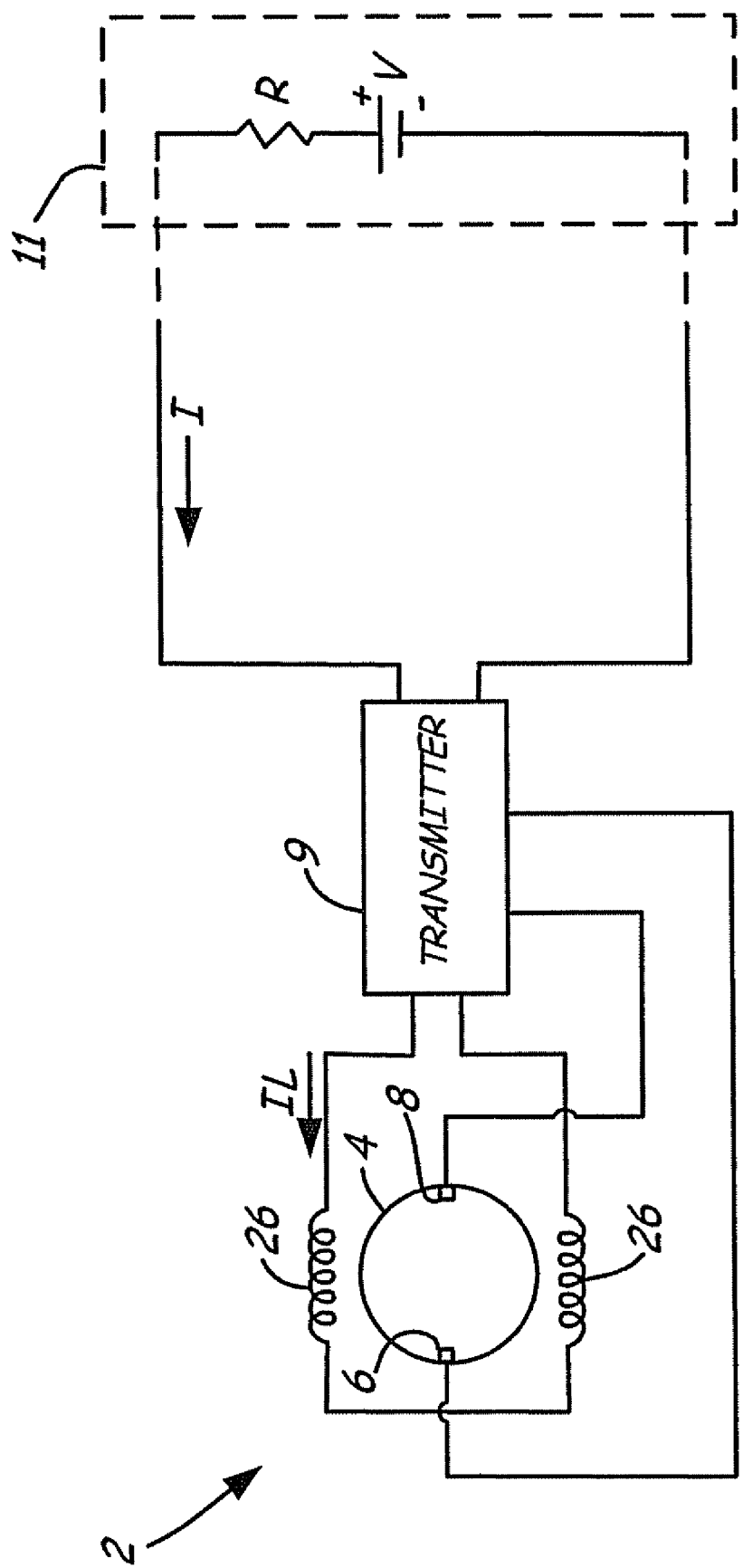
FIG. 1 is a block diagram of a magnetic flowmeter in a two-wire communication loop.

In FIG. 1, magnetic flowmeter system 2 connects to two-wire communication 4-20 mA loop carrying current I and an AC power line (not shown). Flowtube 4 carries a fluid flow. Transmitter 9 supplies coil drive current $I_L$ to coils 26 adjacent flowtube 4 which generate a magnetic field in the fluid. Electrodes 6,8 mount in flowtube 4 along a line perpendicular to the magnetic field in the fluid for sensing EMF induced by the fluid flow. Transmitter 9 senses the EMF between electrodes 6,8 and controls a DC output current I representative of the sensed EMF which is, in turn, proportional to fluid flow. Transmitter 9 transmits current I over a 4-20 mA current loop to a remote receiving station 11. Transmitter 9 can also transmit the flow output digitally using HART digital protocol, a Fieldbus protocol, a wireless protocol, or other technique.

Figure 2:
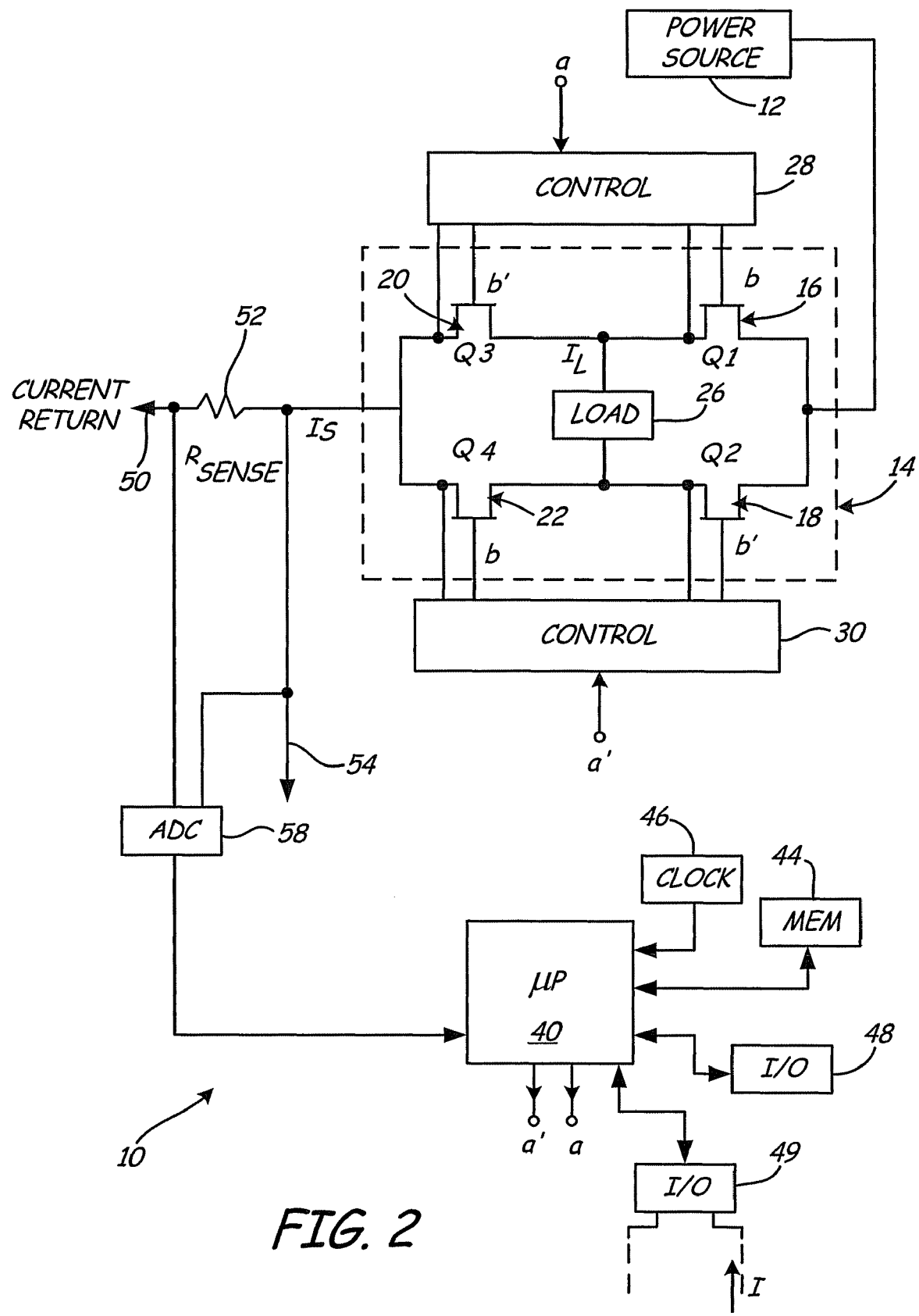
FIG. 2 is a schematic diagram showing a bridge pulse controlled current driver for a magnetic flowmeter.

FIG. 2 shows driver circuitry 10 in transmitter 9. H-bridge flowtube driver 10 of magnetic flowmeter system 2 generates alternating drive current $I_L$ to a load (coils) 26. In H-bridge driver 10, power source 12 energizes a transistor bridge circuit 14. In bridge circuit 14, control circuits 28 and 30 connect to the gates of field effect transistor (FET) 16, FET 18, FET 20 and FET 22 to switch them on in pairs to provide alternating current to load 26. Lines from power source 12 connect to drain terminals of FETs 16 and 18, and to source terminals of FETs 20 and 22. The source terminal of FET 16 and the drain terminal of FET 20 connect to one side of the load 26. Control circuits 28 and 30 convert input HIGH and LOW logic levels to desired voltage bias levels compatible to the gates of transistors 16, 18, 20, 22 for switching between ON and OFF states.

Microprocessor 40 produces control outputs a and a' at the desired operating frequency, typically 37.5 Hz as a function of the sensed current. Outputs a and a' provide logic levels to circuits 28 and 30, respectively. Microprocessor 40 is connected to memory 44, clock 46, operator input/output (I/O) circuitry 48 and loop I/O circuitry 49. Memory 44 contains programming instructions to control operation of microprocessor 40. Microprocessor 40 operates at a speed determined by clock 46 and receives operator command inputs through input/output circuitry 48. Input/output circuitry 49 is used to provide an output connection over the 4-20 mA current loop. Alternatively, or in addition to the loop connection, I/o circuitry 49 can be used for wireless communication.

In one embodiment, supply 12 is a switching power supply. As described below, bridge circuit 14 periodically alternates, or commutates power source 12 through load 26.

During a first alternation or condition period, signal a goes HIGH and a' goes LOW. Control circuits drive signal b HIGH and b' LOW causing transistors 16 and 22 to conduct and transistors 18 and 20 to turn off, thereby supplying current $I_L$ in the direction shown by the arrow. Similarly, during a second alternation or conduction period, signal a goes LOW and a' goes HIGH. Control circuits 28 and 30 drive signal b to LOW and b' to HIGH causing transistors 18 and 20 to turn on and 16 and 22 to turn off thereby supplying current $I_L$ in a direction opposite that shown by the arrow. During normal operation, this alternation is at 37.5 Hz and, in some cases, 6 Hz. However, other frequencies may be used.

Current $I_S$ from power source 12 flows to return path 50 through a sense resistor $R_{SENSE}$ 52. Resistor 52 also connects to signal ground 54. Analog to digital converter 58 connects to sense resistor 52 and provides an output representative of the current through load (coil) 26 to microprocessor 40. The output of A/D circuitry 58 is representative of the magnitude of current $I_S$ flowing through sense resistor 52. Microprocessor 40 monitors the magnitude of $I_S$ as discussed below.

Figure 3A:
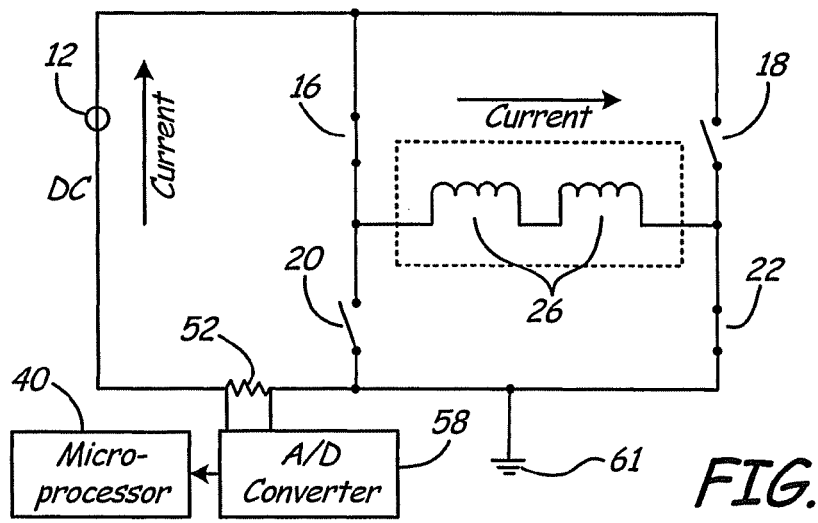
FIG. 3A is a simplified diagram showing drive circuitry coupled to the coils in one configuration.
Figure 3B:
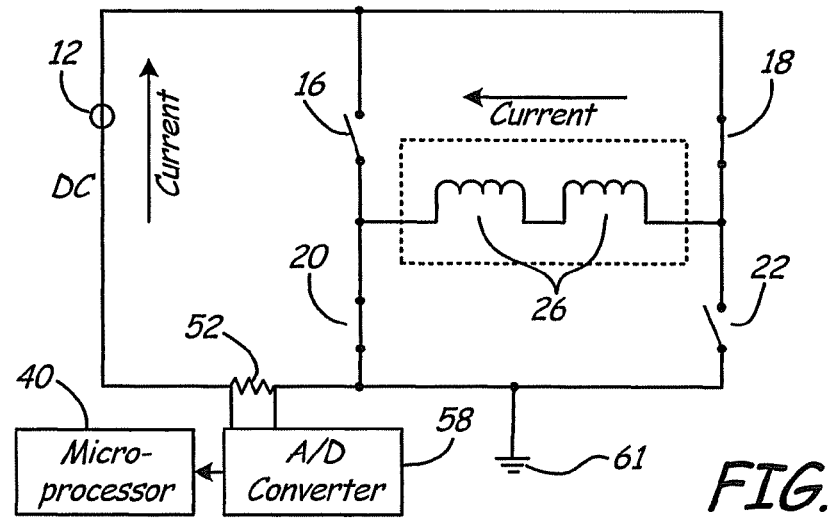
FIG. 3B is a simplified diagram showing the drive circuitry coupled to the coils in a second configuration.

FIGS. 3A and 3B are simplified diagrams showing the conditions of field effect transistors 16-22 during normal operation. Transistors 16-22 are illustrated as switches. In FIG. 3A, field effect transistors 16 and 22 are in a closed condition while transistors 18 and 20 are in an open condition. This allows current from power supply 12 to flow through coils 26 in the direction indicated. In contrast, in FIG. 3B, field effect transistors 16 and 22 are open while transistors 18 and 20 are in a closed position. This allows the current from power source 12 to flow in the direction indicated. An electrical ground 61 which corresponds to the process ground is also shown.

In a typical flowtube, the resistance between the coils 26 and electrical ground is substantially infinite. However, if even a highly resistive path to ground is formed, the resulting flow measurements will be inaccurate. The present invention provides a technique to measure a leakage resistance between the coil 26 and electrical ground 61. This can be used to provide an alert to the operator and provide an indication that a flowtube needs servicing. The resistance can also be used to calculate a percentage of the current drive signal which is lost and/or can be used to correct the error caused by the current leakage.

Figure 4:
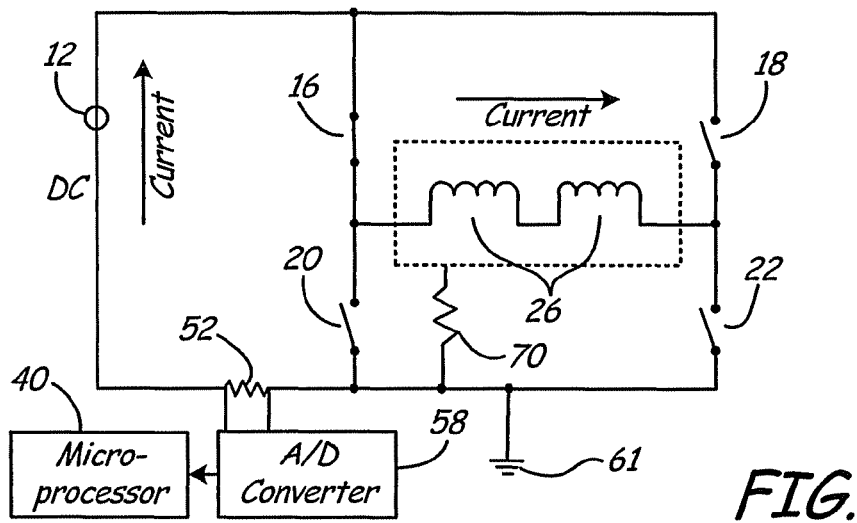
FIG. 4 is a simplified diagram illustrating measurement of the coil to ground resistance.

FIG. 4 is a simplified electrical schematic diagram showing one example of a configuration of the present invention in which the microprocessor 40 and the analog digital converter 58 are configured to operate as diagnostic circuitry to measure a ground path resistance 70 between coil 26 and electrical ground 61. As illustrated in FIG. 4, field effect transistor 16 is closed. This provides an electrical path for current from power source 12 to coils 26. However, field effect transistors 18, 20 and 22 are open in this configuration. Thus, any current flowing through sense resistor 52 measured by analog digital converter 58 is related to the current through the ground path resistance 70. The resistance 70 of the ground path can be calculated as R=V/I, where R is the ground path resistance, V is the voltage across the coil 26 and I is the current through the coil 26. In another example configuration, both field effect transistors 16 and 18 are in a closed condition while transistors 20 and 22 are open. In a further example configuration, only field effect transistor 18 is in a closed state.

Through experimental testing, it was determined that the accuracy of the flow measurements was not significantly affected (i.e., less than 0.01%) if the electrical resistance 70 was 100 kOhms or smaller. The signal loss can be calculated by placing the coil resistance in parallel with the coil to ground resistance 70 and solving for the percent of the drive current that will not pass through the coils 26 to generative an electric field in the moving fluid. For example, a typical coil resistance of 10 ohms can be assumed. This leads to table 1:

TABLE 1

| Resistance | | |
|---|---|---|
| Actual | Measure | Signal Loss |
| Infinity/Open | 3.2 M | 0.000% |
| 900k | 685k | 0.001% |
| 800k | 637k | 0.001% |
| 700k | 538k | 0.001% |
| 600k | 483k | 0.002% |
| 500k | 424k | 0.002% |
| 400k | 344k | 0.002% |
| 300k | 277k | 0.003% |

TABLE 1-continued

| Resistance | | |
|---|---|---|
| Actual | Measure | Signal Loss |
| 200k | 185k | 0.005% |
| 100k | 94.2k | 0.010% |
| 50k | 47.3k | 0.020% |
| 10k | 9.6k | 0.100% |
| 5k | 4.8k | 0.200% |
| 1k | 1.0k | 0.990% |

Although the above description illustrates measuring the electrical resistance of the coil to ground path using the sense resistance, any appropriate configuration may be utilized. For example, a sense resistance can be positioned in other locations, or other current resistance measurement techniques may be utilized. The measurement techniques are not limited to a sense resistor and/or analog to digital converter.

The present invention allows the coil to ground resistance 70 to be checked without using external circuitry and can be performed automatically by the microprocessor 40. This avoids a lengthy process of shutting down the industrial process or otherwise taking the magnetic flowmeter offline. Manual testing is also prone to operator error. The testing may be performed remotely, for example, from a control room. Microprocessor 40 can be instructed to perform a test by communicating over the two-wire process control loop or through other techniques including radio or other wireless communication techniques. The testing can also be performed as a background operation. For example, a test can be periodically performed during a half cycle of the drive current. This automatic testing can be performed periodically, for example, every few minutes or otherwise as desired.

If the resistance of the signal path between the coil and ground is measured, this information can be used to correct the flow measurements for the resultant loss in drive signal. For example, microprocessor 40 can compensate the flow measurements using a compensation algorithm, for example, a polynomial curve fit, linear offset, or the like. This allows the magnetic flowmeter to continue operation prior to replacement or repair of the damaged components. Further, upon determination of a ground path, the flowmeter can be configuring to signal the error to an operator, for example, using an audible alert, by transmitting data over the two-wire process control loop, by wireless transmission, etc.

Figure 5:
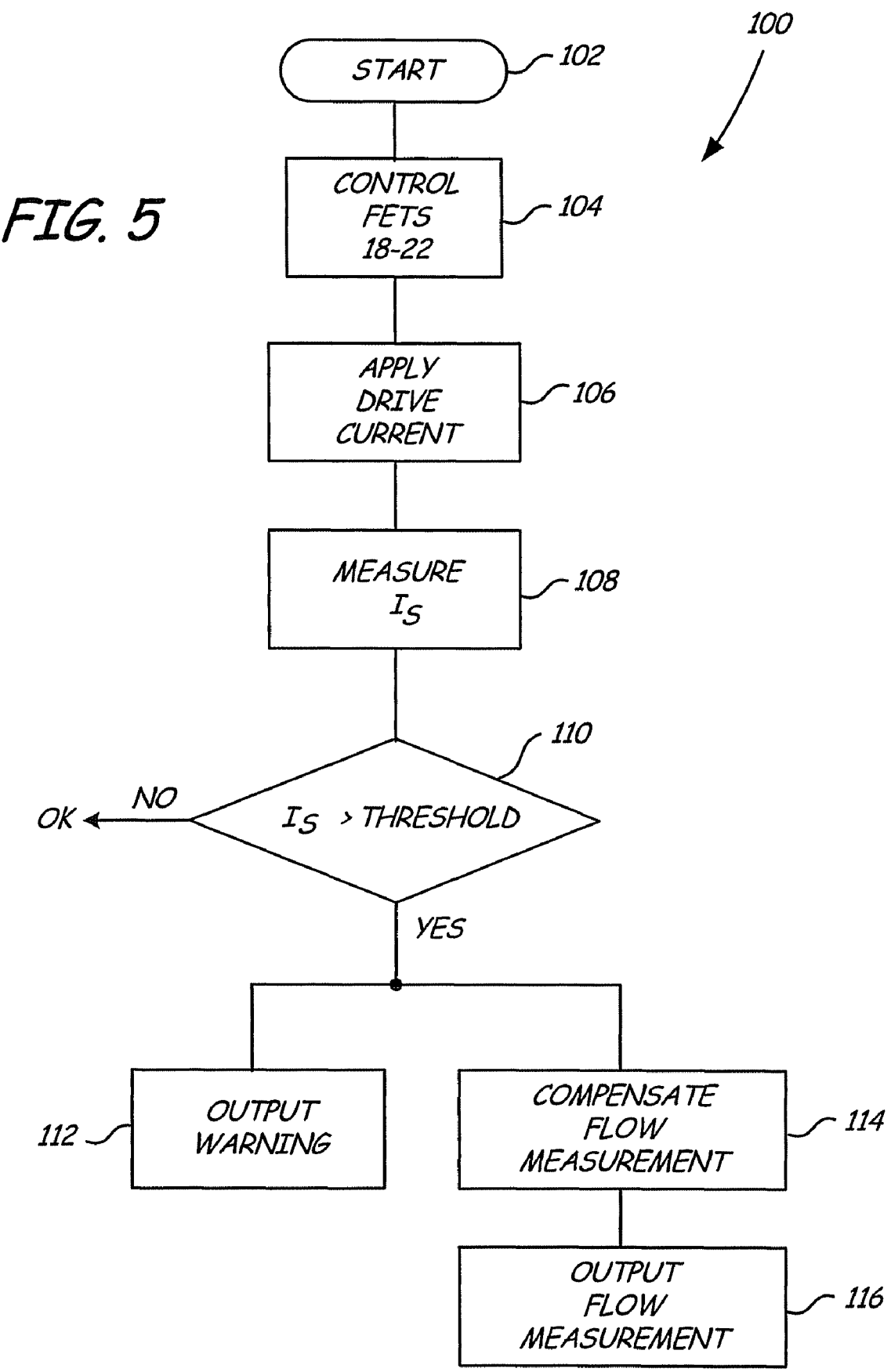
FIG. 5 is a simplified block diagram showing example steps of the present invention.

The particular steps used to perform the diagnostics can be stored as programming instructions in memory 44 for use by microprocessor 40. FIG. 5 is a simplified flowchart 100 showing steps in accordance with the present invention. Flowchart 100 begins at start block 102. At block 104, the field effect transistors 16-22 are controlled as described above. A drive current is applied at block 106 by power source 12 and the resultant current $I_S$ is measured at block 108, for example, using analog to digital converter 58. At block 110, the measured current $I_S$ is compared with a threshold level. The threshold can be set as desired. For example, it may be desirable to have the threshold sufficiently high to avoid falsely identifying a current leakage path. If the current $I_S$ is less than the threshold, operation continues without any fault identifying. However, if the sensed current is greater than the threshold, an output warning can be provided at block 112. Additionally, or alternatively, at block 114 the flow measurements can be compensated based upon the amount of current leaking through the ground path and the compensated flow measurement can be output at block 116. In addition to comparing to a threshold, as illustrated at block 110, other diagnostic techniques can be utilized including monitoring the leakage current for trends over a period of time, sudden change in the leakage current, or other techniques. Further, the output 112 can include additional information including the value of the leakage current, the resistance of the path to ground, a residual life estimate before which service will be required, a percent error in the flow measurements due to the leakage current, etc.

Although the present invention has been described with reference to preferred embodiments, workers skilled in the art will recognize that changes may be made in form and detail without departing from the spirit and scope of the invention. The particular measurement or drive circuitry can be selected as desired. Other types of diagnostic circuitry and algorithms may be employed. The circuitry can be configured to operate automatically, or in response to a recorded instruction.

What is claimed is:

1. A magnetic flow meter, comprising:
   a flowtube arranged to receive a flow of process fluid;
   a coil proximate the flowtube arranged to apply a magnetic field to the process fluid;
   a first electrical switch configured to selectively couple the coil to an electrical ground through a first electrical path;
   a second electrical switch configured to selectively couple the coil to the electrical ground through a second current path;
   a sense electrode arranged to sense a voltage potential in the flowtube in response to the applied magnetic field, the voltage potential indicative of flow rate of process fluid through the flowtube; and
   diagnostic circuitry having an output indicative of a current through an electrical leakage path between the coil and electrical ground.

2. The apparatus of claim 1 including a current source configured to provide a current to the coil.

3. The apparatus of claim 2 wherein the current source comprises an H-bridge.

4. The apparatus of claim 3 wherein the diagnostic circuitry controls operation of switches of the H-bridge.

5. The apparatus of claim 4 wherein the diagnostics circuitry opens an electrical connection in a current return path from the coil.

6. The apparatus of claim 4 wherein the diagnostic circuitry closes an electrical connection between a current source and the coil.

7. The apparatus of claim 1 wherein the diagnostic circuitry is responsive to a received instruction.

8. The apparatus of claim 1 wherein the diagnostic circuitry periodically measures electrical resistance between the coil and ground.

9. The apparatus of claim 1 wherein the diagnostic circuitry measures electrical resistance between the coil and ground during half cycles of a drive signal applied to the coil.

10. The apparatus of claim 1 wherein the diagnostics circuitry measures current through a sense resistance.

11. The apparatus of claim 1 wherein the diagnostic circuitry compares a measured value related to the electrical resistance between the coil and ground and compares the measured value to a threshold.

12. The apparatus of claim 1 wherein the diagnostics circuitry compensates flow measurements based upon electrical resistance between the coil and electrical ground.

13. The apparatus of claim 1 wherein the output from the diagnostics circuitry is coupled to a two wire process control loop.

14. A method for measuring electrical resistance between a coil of a magnetic flow meter and electrical ground, comprising:
   applying an alternating current to the coil proximate a fluid flow;
   sensing a voltage in the process fluid and responsively determining fluid flow;
   measuring coil to ground leakage resistance in accordance with the steps of:
      providing an electrical path between the coil to the current source;
      opening any current return path of the coil to the current source; and
      measuring current flowing through the coil indicative of current flowing to electrical ground through the leakage resistance.

15. The method of claim 14 including providing an H-bridge to generate the alternating current.

16. The method of claim 14 including controlling operation of switches of the H-bridge.

17. The method of claim 14 wherein the measuring is responsive to a command.

18. The method of claim 14 wherein the measuring occurs during half cycles of the alternating current applied to the coil.

19. The method of claim 14 wherein the measuring comprises measuring current through a sense resistance.

20. The method of claim 14 including comparing a measured value related to the electrical resistance between the coil and ground to a threshold.

21. The method of claim 14 compensating flow measurements based upon the measured current.

22. The method of claim 14 including providing an output related to the measured current on a two wire process control loop.

* * * * *